Jan. 24, 1967 A. J. TUCKER ET AL 3,300,156
FILM SCROLL INCLUDING AN END FASTENER
Filed Feb. 24, 1965

LAWRENCE A. ULMSCHNEIDER
ARCHIE J. TUCKER
NEIL S. WHITE
INVENTORS

BY
ATTORNEYS

United States Patent Office 3,300,156
Patented Jan. 24, 1967

3,300,156
FILM SCROLL INCLUDING AN END FASTENER
Archie J. Tucker, Lawrence A. Ulmschneider, and Neil S. White, Rochester, N.Y., assignors to Eastman Kodak Company, Rochester, N.Y., a corporation of New York
Filed Feb. 24, 1965, Ser. No. 434,927
9 Claims. (Cl. 242—74.1)

This invention relates to a film scroll and more particularly to an apparatus and method for fastening a take-up spool to a coreless web roll to form a scroll-like supply of web material.

In the photographic art, when it is desired to package 8 mm. motion picture film in a reasonably thin container which will fit into a light weight camera, we have found certain advantages in using a coreless roll supply with the take-up spool securely fastened to the leader end of the of the film. Although several fastening means for such film leaders have been used in the past, they often utilized various sticky tapes or solvents which tend to be difficult to assemble and sometimes tend to leave sticky residue in the region of the film. Use of other known fastening techniques often develop pressure points in the film which change its image forming characteristics. Such approaches have not proved satisfactory for all applications.

Therefore, an object of the present invention is to provide a film scroll wherein a take-up spool is staked to the leader end of a coreless film roll.

In accordance with one embodiment of our invention, the leader end of a film strip is laterally trimmed or necked down so that it may be forced into a trough of a take-up spool. When the scroll-like film supply is substantially formed, this leader end is staked to the trough of the take-up spool to be tightly wedged therein and cut from the remaining film strip being supplied thereto. The spool trough is made deep enough so that the staking tabs do not engage overlying layers of film.

The subject matter which is regarded as our invention is particularly pointed out and distinctly claimed in a concluding portion of this specification. The invention, however, as to its organization and operation, together with further objects and advantages thereof, will best be understood by reference to the following description taken in connection with the accompanying drawing, in which:

Figure 1:
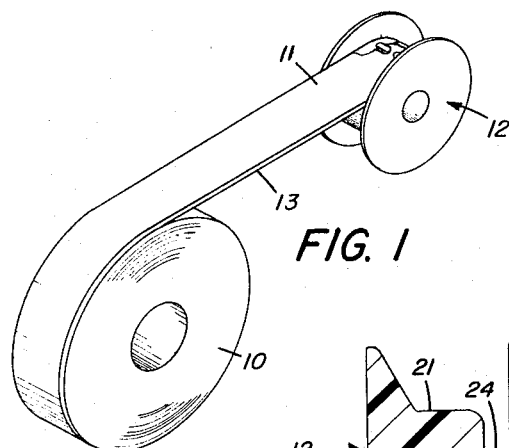
FIG. 1 is a perspective view of a completed scroll-like film supply in accordance with the present invention.

Referring now to the drawing, wherein like numbers indicate similar parts, we have shown in FIG. 1 a scroll made up of a coreless roll 10 having a leader portion 11 secured to a take-up spool 12 so that the film 13 may be wound thereon during picture-taking.

The spool 12 is preferably made of a plastic which may be cold worked. Because of the fact that film is sensitive to concentrated pressure areas, we have arranged the spool 12 and the staking thereof so that the staking tabs do not directly contact the film 13 wound thereover on the spool 12.

Figure 2:
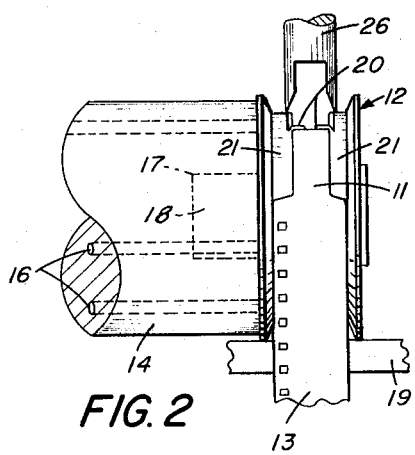
FIG. 2 illustrates an arrangement for staking the film to the take-up spool shown in FIG 1.
Figure 3:
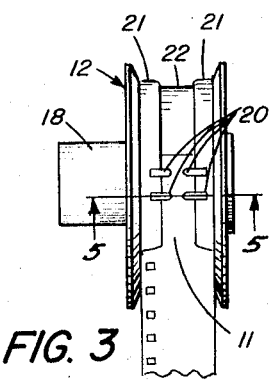
FIG. 3 is a top plan view of the completed take-up spool shown in FIG. 1.

Referring now to FIG. 2, the spool 12 is shown supported on a mandrel 14 by means of vacuum applied to the end surface thereof through a plurality of ports 16. The mandrel 14 is also provided with a central aperture 17 to receive a stem 18 (FIG. 3) of the spool 12. During the staking operation an additional support 19 is provided. The staking tabs are illustrated at 20 and are located entirely beneath the pair of axially spaced film winding surfaces 21. Thus the tabs lie in a trough 22 which is centered between the surfaces 21 as illustrated. We prefer the trough be annular so that it is not necessary to orient the spool during assembly of the scroll and that the film support surfaces 21 are similar in shape to provide equal support to both sides of the film 13 wound thereon.

Figure 4:
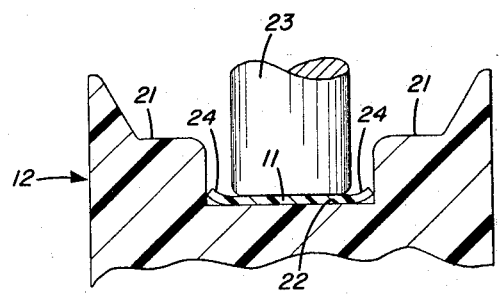
FIG. 4 is a sectional view of a portion of the spool prior to staking.

During the making of the scrool-like film supply, the leader end portion 11 of the film 13 is laterally trimmed or necked down to about one-third of its nominal width so that it may be forced against the inner surface of the trough 22. Prior to staking, the leader end portion 11 is forced into the trough 22 by a tool 23. As shown more clearly in FIG. 4, the edges 24 of the film end are curled upward slightly because the film is trimmed to a size slightly wider than the width of the trough 22. This curl provides a substantial binding force to hold the film against winding forces.

Figure 5:
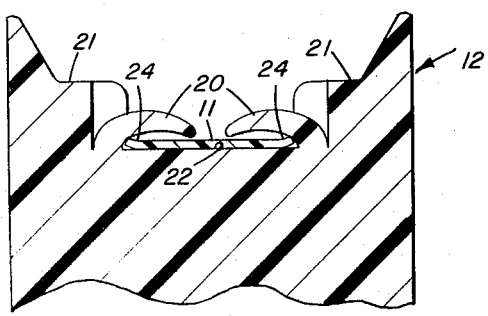
FIG. 5 is a partial section view taken along the line 5—5 of FIG. 3.

As shown more clearly in FIG. 5, this binding force is greatly accentuated by the tabs 20 forcing the curled edges 24 further downward in the trough 22. The tabs 20 are developed as shown in FIG. 2. When the leader portion 11 is in its proper position, a staking tool 26 is positioned to engage each of the annular film winding surfaces 21 to cold work the spool material and form the tabs 20. We prefer that the spool 12 be made of a plastic which is readily cold worked. Thus the leader portion 11 of the film 13 is tightly secured within the trough 22 of the spool 12 by the tabs pushing the curled edges 24 downward.

While we have shown a particular embodiment of this invention, modifications thereof will occur to those skilled in this art. For instance, when using plastic that is not easily cold worked for the spool 12, the staking tool 26 may be heated. We intend, therefore, to have the appended claims cover such embodiments as properly fall within the scope of the present invention.

We claim:
1. A scroll-like film supply comprising:
   a coreless roll of film having a leader portion extending therefrom;
   a spool having at least one annular winding support surface and a trough portion of relatively smaller radius; and
   staking tabs securing the leader portion in the trough portion, said staking tabs being entirely below said support surface whereby they do not engage film layers supported thereon.

2. A scroll-like film supply as in claim 1 wherein the trough portion is centered between similar annular support surfaces and said staking tabs are developed from material of each of the surfaces.

3. A scroll-like fiilm supply as in claim 1 wherein the end of the leader portion is trimmed to a size which may be forced between the sides of the trough portion to be wedged against the inner surface of the trough in the region of said tabs whereby overlying layers of film will be supported above said tabs by the annular support surface.

4. A scroll-like film supply comprising:
   a coreless roll of film having a leader portion extending therefrom, the leader portion being trimmed to about one-third of the width of the film;
   a spool having a pair of balanced annular winding support surfaces and an annular trough portion centered therebetween and being of relatively smaller radius and having a width slightly less than that of the trimmed leader portion; and staking tabs securing the leader portion in the trough portion, the trough portion being of a depth relative to the annular surfaces so that said staking tabs lie entirely below said support surfaces whereby they do not engage overlying film layers supported thereon.

5. A scroll-like film supply as in claim 4 wherein said staking tabs are developed from material of each of the surfaces.

6. A scroll-like film supply comprising:
   a spool having a film support region and a narrower trough region;
   a coreless roll of film having a leader portion forced into said narrower trough region so that its edges are curled upward by the sides of the trough; and
   staking tabs overlying a region of the leader portion to engage the upward curled edges and prevent outward movement thereof, said tabs lying entirely within the trough region as distinguished from the film support region.

7. A spool for a film end having a main portion and a narrower leader portion, comprising:
   a generally cylindrical body portion having at least one annular support surface formed of material deformable by a staking tool;
   a trough portion having a relatively smaller radius adjacent to said annular support surface for receiving the narrower leader portion of the film, and
   staking tabs developed from the adjacent wall portion of said annular support surface to overlie and engage the film leader portion in said trough, said staking tabs being of a thickness less than the height of said annular support surface over the film leader portion.

8. A method of fastening a narrow leader portion of a film end to a film spool comprising the steps of:
   inserting the narrow leader portion into a trough of a film spool; and
   staking the leader portion with material developed by deformation of the walls of the trough to attach it in the trough to the film spool.

9. A method as in claim 8 wherein the inserting step compresses the film leader portion between the walls of the trough; and
   the staking step furthers this compression.

References Cited by the Examiner
UNITED STATES PATENTS

| | | | |
|---|---|---|---|
| 1,793,198 | 2/1931 | Towne | 242—74.1 |
| 2,343,980 | 3/1944 | Keene | 242—74 |
| 2,663,513 | 12/1953 | Herrmann et al. | 242—71.8 |

FRANK J. COHEN, *Primary Examiner.*

N. L. MINTZ, *Assistant Examiner.*